United States Patent
Rakshit et al.

(10) Patent No.: US 10,891,916 B2
(45) Date of Patent: Jan. 12, 2021

(54) AUTOMATED SMART WATCH COMPLICATION SELECTION BASED UPON DERIVED VISIBILITY SCORE

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/203,940

(22) Filed: Nov. 29, 2018

(65) Prior Publication Data

US 2020/0175940 A1 Jun. 4, 2020

(51) Int. Cl.
*G09G 5/00* (2006.01)
*G06F 1/16* (2006.01)
*G06K 9/00* (2006.01)

(52) U.S. Cl.
CPC ............ *G09G 5/006* (2013.01); *G06F 1/163* (2013.01); *G06F 1/1694* (2013.01); *G06K 9/00255* (2013.01); *G09G 2320/041* (2013.01); *G09G 2340/045* (2013.01); *G09G 2360/144* (2013.01)

(58) Field of Classification Search
CPC ... G06F 1/163; G09G 5/006; G09G 2360/144
See application file for complete search history.

(56) References Cited

U.S. PATENT DOCUMENTS

| | | | |
|---|---|---|---|
| 6,525,997 B1 | 2/2003 | Narayanaswami et al. | |
| 7,302,280 B2 | 11/2007 | Hinckley et al. | |
| 10,481,635 B2 | 11/2019 | Robinson et al. | |
| 10,520,895 B2 | 12/2019 | Kim | |
| 2008/0165116 A1 | 7/2008 | Herz et al. | |
| 2013/0152002 A1* | 6/2013 | Menczel | G06F 3/0488 715/765 |
| 2014/0210802 A1 | 7/2014 | Myers et al. | |
| 2016/0125846 A1 | 5/2016 | Xu et al. | |
| 2017/0010677 A1* | 1/2017 | Roh | G06F 3/0488 |
| 2017/0011210 A1* | 1/2017 | Cheong | A61B 5/0022 |
| 2018/0081515 A1 | 3/2018 | Block et al. | |
| 2018/0150212 A1 | 5/2018 | Chen et al. | |

FOREIGN PATENT DOCUMENTS

WO 2017/030646 A1 2/2017

* cited by examiner

*Primary Examiner* — Michael Pervan
(74) *Attorney, Agent, or Firm* — Tutunjian & Bitetto, P.C.; Michael A. Petrocelli

(57) ABSTRACT

A method of controlling a display of a mobile device that includes displaying of a screen of a mobile device at least one initial complication; assigning threshold conditions for said at least one initial complication; monitoring real time conditions for the mobile device; and modifying the at least one initial complication being displayed on the screen of the mobile device for higher visibility when the conditions being monitored in real time change to trigger a display change for the complications.

8 Claims, 6 Drawing Sheets

AUTOMATED SMART WATCH COMPLICATION SELECTION BASED UPON DERIVED VISIBILITY SCORE

BACKGROUND

Technical Field

The present invention generally relates to electronic devices including displays, and more particularly to methods of changing the display of electronic devices in response to user interactions and/or environmental factors.

Description of the Related Art

Smart watches enable a user to customize their watch face with elements known as complications. There are complications for time (such as a digital clock or analog clock layout), date, weather, calendar, activity, and portals to many other apps that run on smart watches.

The more complications added to a smart watch, the harder they can be to see. For example a smart watch face can be cluttered with information showing a user's calendar, time of day, steps taken, outdoor temperature and so forth. While a user may be able to clearly discern each complication in good visibility conditions, for example when looking at the watch face indoors, that same user may struggle to see everything on the watch face when outdoors in bright sunlight.

SUMMARY

The methods and structures of the present disclosure automatically adjust the complications on a mobile device screen based upon the visibility of the mobile device screen to the user.

In one aspect, a method of controlling a display of a mobile device is provided. In one embodiment, the method includes displaying on a screen of a mobile device at least one initial complication; and assigning threshold conditions for said at least one initial complication. In some embodiments, the method continues with monitoring real time conditions for the mobile device. In some embodiments, the method further includes modifying the at least one initial complication being displayed on the screen of the mobile device for higher visibility when the conditions being monitored in real time change to trigger a display change for the complications.

In another aspect, a mobile device is provided that includes a display, in which the content of the display adjusts for greater visibility in response to changes in environmental conditions. In one embodiment, the mobile device comprises a screen for displaying a complication, and at least one sensor for measuring an ambient environment that the mobile device is present in. The mobile device also includes at least one microcontroller that monitors the ambient environment that is being measured by the at least one sensor, and modifies said complication for increased visibility in response to ambient changes measured by the at least one sensor.

In yet another embodiment, a mobile device is provided that includes a display, in which the content of the display adjusts for greater visibility in response to changes in the frequency of user interactions. In one embodiment, the mobile device comprises a screen for displaying a complication, and at least one sensor for measuring user interactions with the mobile device. The mobile device also includes at least one microcontroller that monitors the user interactions that are being measured by the at least one sensor, and modifies said complication for increased visibility in response to changes in user interaction measured by the at least one sensor.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
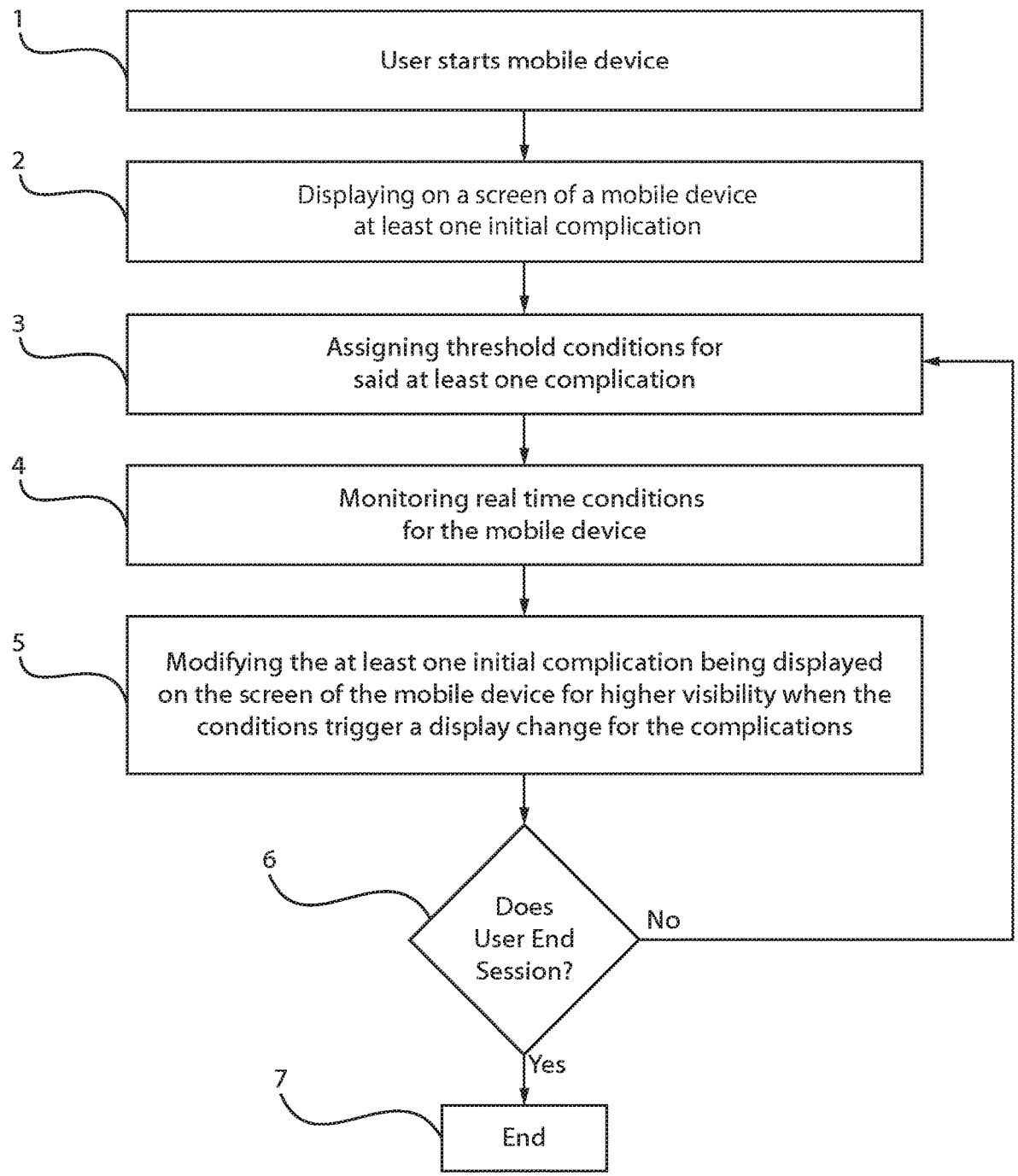
FIG. 1 is a flow/block diagram showing one embodiment a method of controlling the display of at least one complication on a screen of a mobile device in response to real time conditions being monitored by the mobile device, in accordance with some embodiments of the present disclosure.

The methods and structures of the present disclosure related to the rendering of complications on the face of a mobile device. The term "complication" refers to data being displayed on a screen of a mobile device. Examples of complications can be text, time, graphics and combinations thereof. Complications can be data boxes being depicted on the screen of a mobile device, such as a data box for time, the calendar date, and a mailbox of an email system. These examples are provided for illustrative purpose only, and the present disclosure is not intended to be limited to solely these examples. Additionally, although the methods and structures described herein are applicable to all mobile devices having display screen, in the following figures, the mobile device is specifically depicted as a watch, e.g., smart watch. The depiction of a watch as the example of a mobile device is not an indication that the mobile devices in accordance with the present disclosure be limited to only watches.

The type and number of complications rendered relate directly to the user's ability to see them. This ensures that when a user is in a situation where it is hard to see the screen of their smart watch (such as in direct sunlight) the watch face is configured to reduce the number of complications shown while still allowing the user to view important information such as the time. As visibility conditions improve, the number and type of complications is modified. In one example, under low visibility situations, such as looking at a smart watch in direct sunlight, only the time complication may be shown in a large font, or the time may be repeated across the screen. When visibility improves (such as the user shading the watch screen with the palm of their hand) then additional or alternative complications can be automatically added to the watch face. The methods and structures are now described with greater detail with reference to FIGS. 1-8.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
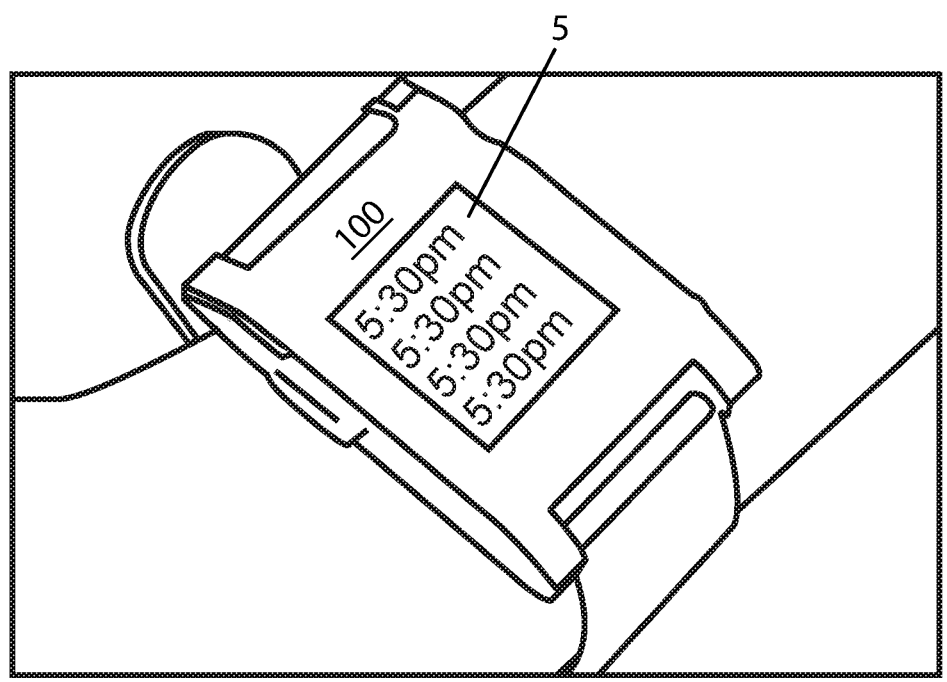
FIG. 2 is a perspective view of a complication being depicted on a display of a mobile device multiple times for the purpose of increasing visibility, in accordance with one embodiment of the present disclosure.

FIG. 1 is a flow/block diagram showing one embodiment a method of controlling the display of at least one complication 5 on a screen 10 of a mobile device 100 in response to real time conditions being monitored by the mobile device. As will be described in further detail throughout the present disclosure, the system first derives how easily a user can view the content of the mobile device, e.g., smart watch, screen 10, considering factors such as brightness of the environment, location, and user-related visibility indicators. With the visibility score derived, the display 10 is customized with complications 5 that best represent the visibility score. If visibility is low, larger and fewer complications 5 are used and complications can be repeated multiple times on the watch face, as depicted in FIG. 2. The system continually monitors the visibility score to detect changes. For example if a user uses their hand to shade the watch screen from sunlight (therefore improving visibility), additional complications can be added to the watch face.

In some embodiments, the method of controlling a display 10 of a mobile device 100 may begin with block 1 with a user turning the mobile device 100 to on. Although some embodiments of the wearable devices and/or mobile devices 100 employed in the methods, systems, apparatus, and computer products of the present disclosure may be described herein as a time piece, such as a wrist watch, i.e., a watch temporarily affixed to a user's wrist by a band, the present disclosure is not limited to only this type of mobile electronic device 100. For example, any device including a display and computing capabilities may be employed for the use with the methods and structures described herein, and it is not necessary that the device include a time keeping function. The device may include communication modules to display media to the user, as well as news updates, social media updates. The device may have smartphone capability, as well as e-mail capability, and/or other communication capabilities. In some embodiments, the display of the wearable/mobile electronic device is powered by a battery power source.

At block 2 of the method depicted in FIG. 1, the screen 10 may displaying of a screen 10 at least one initial complication 5. The initial complication 5 may be selected to correspond to a baseline condition, i.e., baseline environmental condition, e.g., baseline lighting environment, and/or a baseline user interaction behavior, e.g., normal movement. The initial complication 5 may be a small font size or moderate font size indication of time on the display 10 of the mobile electronic device 100.

At block 3 the method may continue with assigning threshold conditions for the at least one initial complication. The threshold condition is a value that when reached and measured by the mobile device 100 causes a change in the complications 5 on the display to increase their visibility. The threshold condition is typically associated with the type of characteristics either of the environment that the mobile device 100 present in, or in response to user interactions with the mobile device 100, which results in poor visibility of the display 10.

In some embodiments, the threshold condition is an environmental condition selected from the group consisting of location of environment, brightness of environment, temperature of environment, weather of environment, time of day, and combinations thereof. The threshold condition may also be a user interaction that is measured by the mobile device 100, e.g., watch. In some examples, the threshold condition is a user interaction selected from the group consisting of facial recognition by said mobile device, movement of the mobile device characteristic with mobile device use, and interaction with the user with buttons of the mobile device. The wearable device 100 may also include a communications module for accessing a database of motions that are correlated to the threshold condition. For example, at least one of the database of motions, e.g., personalized profiles, and/or generic profiles may be provided by a cloud computing environment, and the wearable device may communicate with the cloud computing environment via the communications module. In another example, at least one of the database of motions, e.g., personalized profiles and/or generic profile data may be provided and stored within a device memory within the electronics package of the mobile and/or wearable device 100.

Referring to FIG. 1, the method may continue at block 4 with monitoring real time conditions for the mobile device 100. By monitoring real time conditions, the method determines whether the conditions that the mobile device 100 is being subjected to have changed enough to reach the threshold condition that would result in adjustments to the complications 5 being displayed on the mobile device screen 10. In some embodiments, the real time conditions are environmental conditions. Environmental conditions can be measured by sensors on the mobile device 100. For example, the location of the environment in which the mobile device 100 is present may be measured by an on board GPS. The brightness of the environment may be measured by an ambient light sensor that is integral with the mobile device 100. A camera may also be employed to determine whether the mobile device 100 is in a bright environment, e.g., outside, or in a dark environment, e.g., outdoors. The temperature of the environment can be measured by a thermometer or other temperature sensor. Weather conditions may be updated to the mobile device by wireless interface via a communications module. The time and date may be set using conventional methods, such as the convention method of setting the time and date of the watch.

In some embodiments, the real time conditions being monitored at block 4 are user interactions with the mobile device 100. The monitoring of real time conditions user comprises a motion sensor mounted to the mobile device 100. The motion sensor may be an accelerometer, a gyroscopic sensor, a 3-dimensional (3D) depth sensor, a gravity sensor or a combination thereof. The motions sensors may measure the motions of the user interaction with the mobile device 100 to determined whether the measured motions match a preset motion that provides a threshold condition. In other embodiments, the real time conditions are monitored using a front facing camera mounted to the mobile device. The front facing camera may be able to perform facial recognition. In this example, if a user wearing a mobile device 100 on their wrist raises their wrist to eye level, the front facing camera may recognize the user by facial recognition. For example, eye contact with the camera may signal the mobile device to change the complications being displayed, e.g., by being bigger, because the eye contact to the front facing camera illustrates the user is viewing the displayer 10.

In other examples, the user interaction being monitored may be whether the user actuates a button on the mobile device housing 100. The actuation of the button may meet a threshold conditions in some embodiments of the present disclosure.

Referring to FIG. 1, in the instances, when a condition is measured during the monitoring stage at block 4 that matches a threshold condition, the method may further include modifying the at least one initial complication 5 being displayed on the screen 10 of the mobile device 100 having higher visibility when the conditions being monitored in real time change to trigger a display change 10 for the complications 5. As noted, a complication 5 may include font size, information type, font effects, repetition of information type and combinations thereof. In some embodiments, modifying the at least one initial complication being displayed on the screen of the mobile device for higher visibility comprises increasing size of text font, increasing the number of data regions on the display, multiplying the data being displayed, moving the data being displayed across the display or a combination thereof. Modifying the at least one initial complication does not include increasing brightness of the display 5.

Figure 3A:
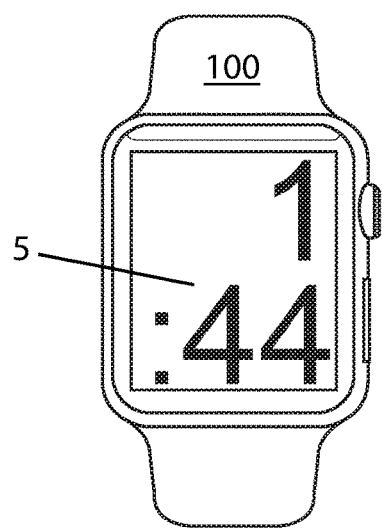
FIG. 3A is a perspective view of a plurality of complications being depicted on the display of a mobile device, in which the text of the complications is exceptionally large due to a low visibility score, in accordance with other embodiments of the present disclosure.
Figure 3B:
FIG. 3B is a perspective view of a plurality of complications being depicted on the display of a mobile device, in which the text of the complications is medium side due to a low visibility score, in accordance with other embodiments of the present disclosure.
Figure 3C:
FIG. 3C is a perspective view of is a perspective view of a plurality of complications being depicted on the display of a mobile device, in which the text of the complications is medium side due to a low visibility score, in accordance with other embodiments of the present disclosure.

FIGS. 3A-3C are perspective views of a plurality of complications 5 being depicted on the display 10 of a mobile device 100. FIGS. 3A-3C illustrate some examples of modifications that can be made to the initial complications in the process flow illustrated through blocks 2-5 of FIG. 1. FIG. 3A is a perspective view of a plurality of complications being depicted on the display of a mobile device, in which the text of the complications is exceptionally large due to a low visibility score. In this example, the text of the complications 5 has been increased from the initial complications at block 1 of the method depicted in FIG. 1.

FIG. 3B is a perspective view of a plurality of complications 5 being depicted on the display 10 of a mobile device 100, in which the text of the complications 5 are medium size due to a medium visibility score measured during the monitoring step at block 4 of the method illustrated in FIG. 2. In this example, the text of the complications 5 has been increased from the initial complications at block 1 of the method depicted in FIG. 1, but has not increased as greatly as depicted in FIG. 3A. In addition to showing a single complication 5 for time in FIG. 3A, the complication for the structure depicted in 3B also included activity rings.

FIG. 3C is a perspective view of is a perspective view of a plurality of complications being depicted on the display of a mobile device, in which the text of the complications 5 is small size due to a high visibility score. The complications in FIG. 3C can illustrate one example of complications that are consistent with the initial complications described with reference to block 1 of FIG. 1.

The examples of compilations 5 depicted in FIGS. 3A-3C illustrates only one example of compilations that can be depicted on the display 10 of the mobile device 100. Modification of complications 5 shown on the watch face, i.e., display 10, can include modifications to the size of complications, in which where the visibility score is low, larger fonts and graphics can be used to make a complication 5 easier to see. Modifications to the complications 5 can also include a changes in the number of complications 5. The more complications 5 added to the watch screen 10, the harder each complication 5 can be to see in low visibility score conditions. Modifications to the complications 5 can also include repeating the complications. In low visibility score conditions, a complication 5 can be repeated multiple times, so that if a portion of a watch screen is particularly hard to see, the user can see the same complication 5 elsewhere on the screen 10.

Referring back to FIG. 1, the method may continue to conduct analysis and recalculate the display of complications 5 at block 6. When the system continues to perform the analysis, the method loops back to block 3. If the system detects a significant change in visibility (for example the user moves to a shaded area, moves indoors, or uses their hand to shield the watch screen from the sun) then a new visibility score is generated. The complications 5 are adjusted based on these changing conditions. Therefore a user may look at their mobile device 100, e.g., watch, in bright sunlight and see only the time in an extra-large font, but then shield their watch screen and see a modified watch face, i.e., display, with additional complications 5 added. When the mobile device 100 is no longer shielded, the complications 5 return to their previous state.

Figure 4:
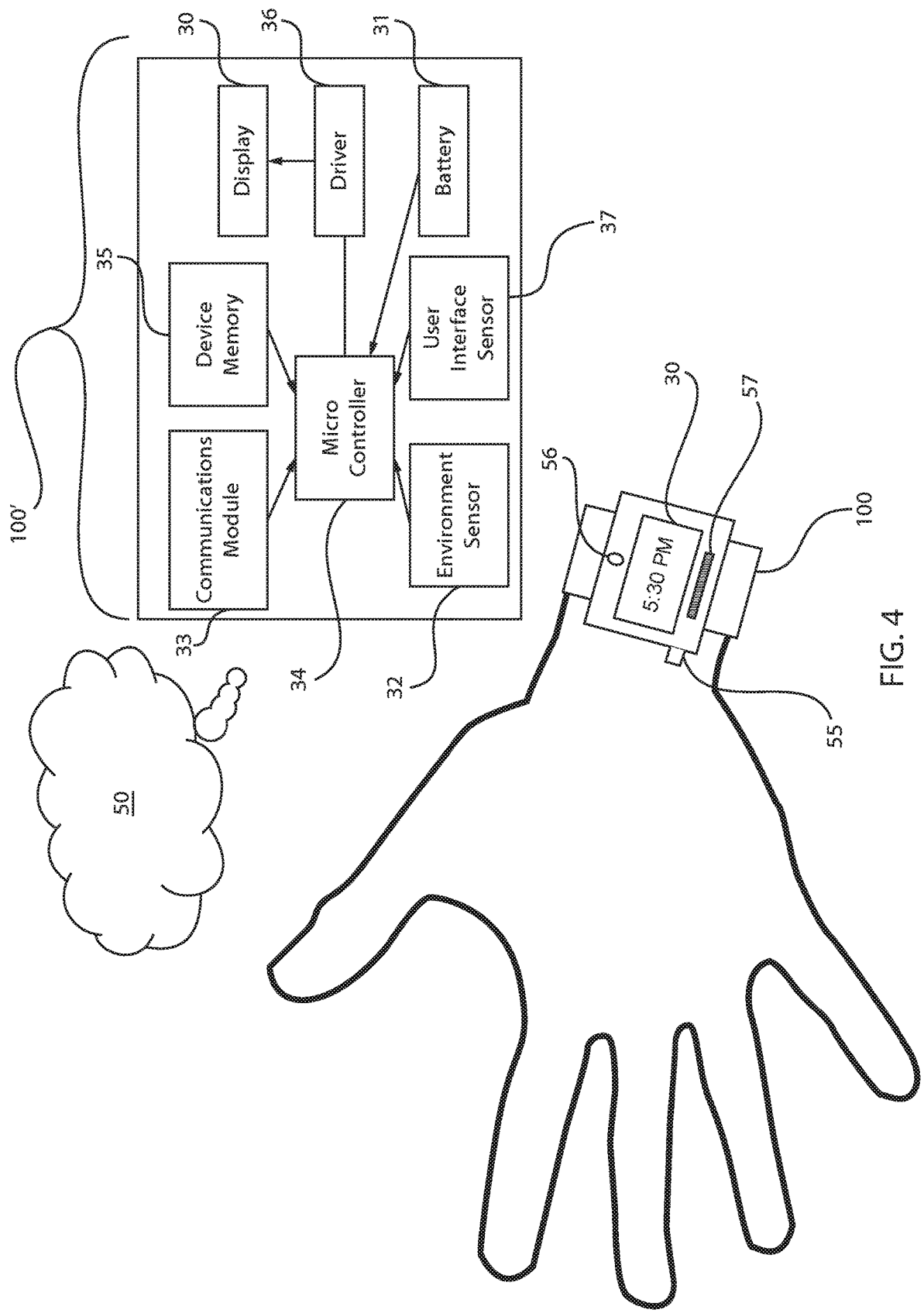
FIG. 4 is a block diagram illustrating one embodiment of a system for controlling a display of a mobile device, in accordance with an embodiment of the present invention.

FIG. 4 is a schematic of a mobile device 100, e.g., watch, is provided that can function in the manner of the method described in FIG. 1. In FIG. 4, the call out box identified by 100' depicts some of the internal components of the mobile device 100. In the embodiment depicted in FIG. 4, the mobile device 100 is a wristwatch. However, this is only an example embodiments, and any mobile and/or wearable device is suitable for the methods, structures, systems and computer program products described herein. For example, the wearable device may include wristband, a neck lanyard, a clothing mounted device, a belt mounted device, a footwear mounted device and combinations thereof.

The mobile device 100 may include a display screen 10 for displaying at least one complication 5. The display screen 10 may be provided by any display type, such as a liquid crystal display (LCD), light emitting diode (LED) display, organic light emitting diode (OLED), as well as other types of displays typically employed in electronic devices that are employed as wearable devices and/or mobile devices.

Referring to FIG. 4, the mobile device 100 may also include at least one sensor for measuring an ambient environment, i.e., environment sensor 32, that the mobile device 100 is present in; and at least one sensor for measuring user interactions with the mobile device, i.e., user interface sensor 37. The mobile device 100 also includes at least one microcontroller 34 that monitors the user interactions that are being measured by the at least one user interface sensor 37, and modifies said complication 5 for increased visibility in response to changes in user interaction measured by the at least one sensor 37. The microcontroller 34 also monitors the ambient environment that is being measured by the at least one environmental sensor 32, and modifies said complication for increased visibility in response to ambient changes measured by the at least one environmental sensor 32. The at least one environmental sensor 32 can be selected from a GPS mounted to said mobile device, an ambient light sensor mounted to said mobile device, a thermometer mounted to said mobile device, a receiver mounted to the mobile device and combinations thereof. The at least one user interface sensor 37 can be the at least one sensor is a motion sensor mounted to the mobile device, a front facing camera mounted to the mobile device, or a combination thereof.

The mobile device 100 may include a power source for powering the display screen 30 to effectuate change between the at least two display states. The power source may be a battery that may be a lithium ion battery, a nickel cadmium (NiCd) battery, a nickel-metal hydride (NiMH) battery, a lead acid battery, a lithium polymer battery or a combination thereof.

The wearable device 100 may also include a motion sensor 32 for measuring motion of the wearable device. The wearable device 100 may also include a communications module 33 for accessing a database of motions that are correlated to display states of the electronic device 100.

It is understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
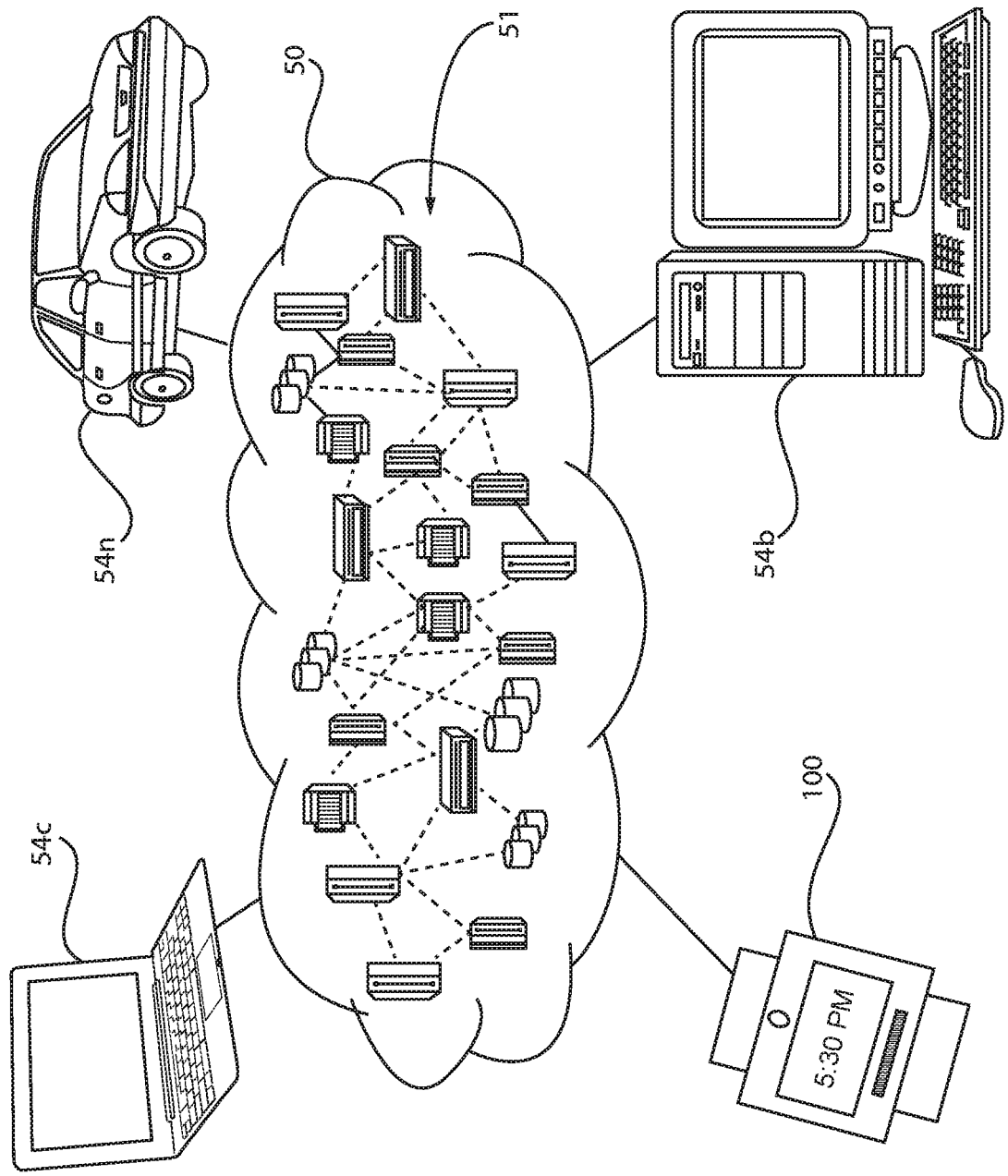
FIG. 5 depicts a cloud computing environment according to an embodiment of the present disclosure.

Referring now to FIG. 5, illustrative cloud computing environment 50 is depicted. As shown, cloud computing environment 50 includes one or more cloud computing nodes 51 with which local computing devices used by cloud consumers, such as, for example, mobile and/or wearable electronic devices 100, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 51 and cloud computing environment 50 can communicate with any type of computerized device over any type of network and/or network addressable connection (e.g., using a web browser).

Figure 6:
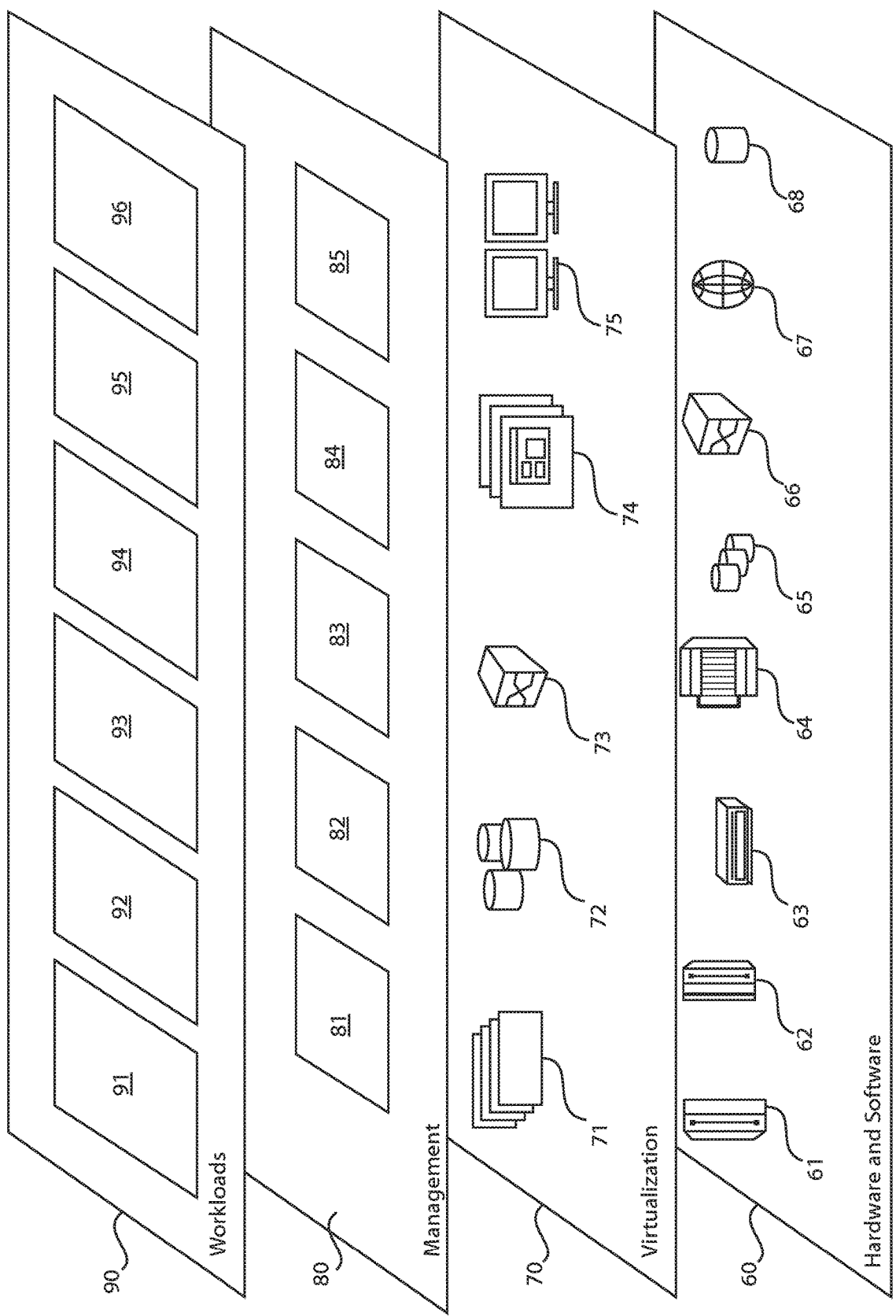
FIG. 6 depicts abstraction model layers according to an embodiment of the present disclosure.

Referring now to FIG. 6, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated selection of complications based of visibility of display screen on a mobile computing device. 96. The change in complications is response to environment sensors and sensors measuring user interfacing with the system. The methods are further described with reference to FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Having described preferred embodiments of a system and method and computer program product for determining trends in patented technology, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

Having described preferred embodiments of an intelligent display ON/OFF switching for electronic device displays (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method of controlling a display of a mobile device comprising:
    displaying of a screen of a mobile device at least one initial complication, the mobile device including at least one motion sensor and at least one light sensor;
    assigning threshold conditions for said at least one initial complication, the threshold conditions including a triggering motion of the mobile device and a threshold ambient lighting condition for setting the number of complications;
    monitoring real time conditions for the mobile device, the real time conditions including a measurement with the at least one motion sensor of real time motion to device to determine if the real time motion at the real time conditions matches the triggering motion, and when the real time motions match the triggering motion, the real time conditions being monitored further including a measurement of real time ambient lighting with the at least one light sensor; and
    modifying the at least one initial complication being displayed on the screen of the mobile device for higher visibility by changing the number of complications being depicted, and changing a size of the number of complications when the conditions being monitored in real time change to trigger a display change for the complication includes the real time motion matching the triggering motion, and the real time ambient lighting matching the threshold ambient lighting condition to trigger said modifying the at least one initial complication.

2. The method of claim 1, wherein the mobile device is selected from the group consisting of a watch, tablet, laptop, wearable device and combination thereof.

3. The method of claim 1, wherein a complication includes font size, information type, font effects, repetition of information type and combinations thereof.

4. The method of claim 1, wherein said monitoring real time conditions for the mobile device includes a device selected from the group consisting of a motion sensor mounted to the mobile device, a front facing camera mounted to the mobile device, and a combination thereof.

5. The method of claim 1, wherein said modifying the at least one initial complication being displayed on the screen of the mobile device for higher visibility comprises increasing size of text font, increasing the number of data regions on the display, multiplying the data being displayed, moving the data being displayed across the display or a combination thereof.

6. A mobile device comprising:
    a screen for displaying at least one complication;
    memory for storing a triggering motion of the mobile device and a threshold lighting condition for setting the number of said at least one complication on said screen;
    at least one motion sensor for measuring motion of the mobile device;
    at least one light sensor for measuring a real time light condition of an ambient environment that the mobile device is present in; and
    at least one microcontroller that monitors the ambient environment that is being measured by the at least one light sensor when measuring a real time motion that is measured with the at least one motion sensor matches the triggering motion stored in the memory, and modifies a number of said at least one complication for increased visibility in response to ambient changes measured by the at least one light sensor, when the ambient changes reach a threshold lighting condition.

7. The mobile device of claim 6, wherein the mobile device is selected from the group consisting of a watch, tablet, laptop, wearable device and combination thereof.

8. The mobile device of claim 6, wherein a complication includes font size, information type, font effects, repetition of information type and combinations thereof.

\* \* \* \* \*